A. H. STEVENS.
Corn Sheller.
No. 14,745.
Patented April 22, 1856.
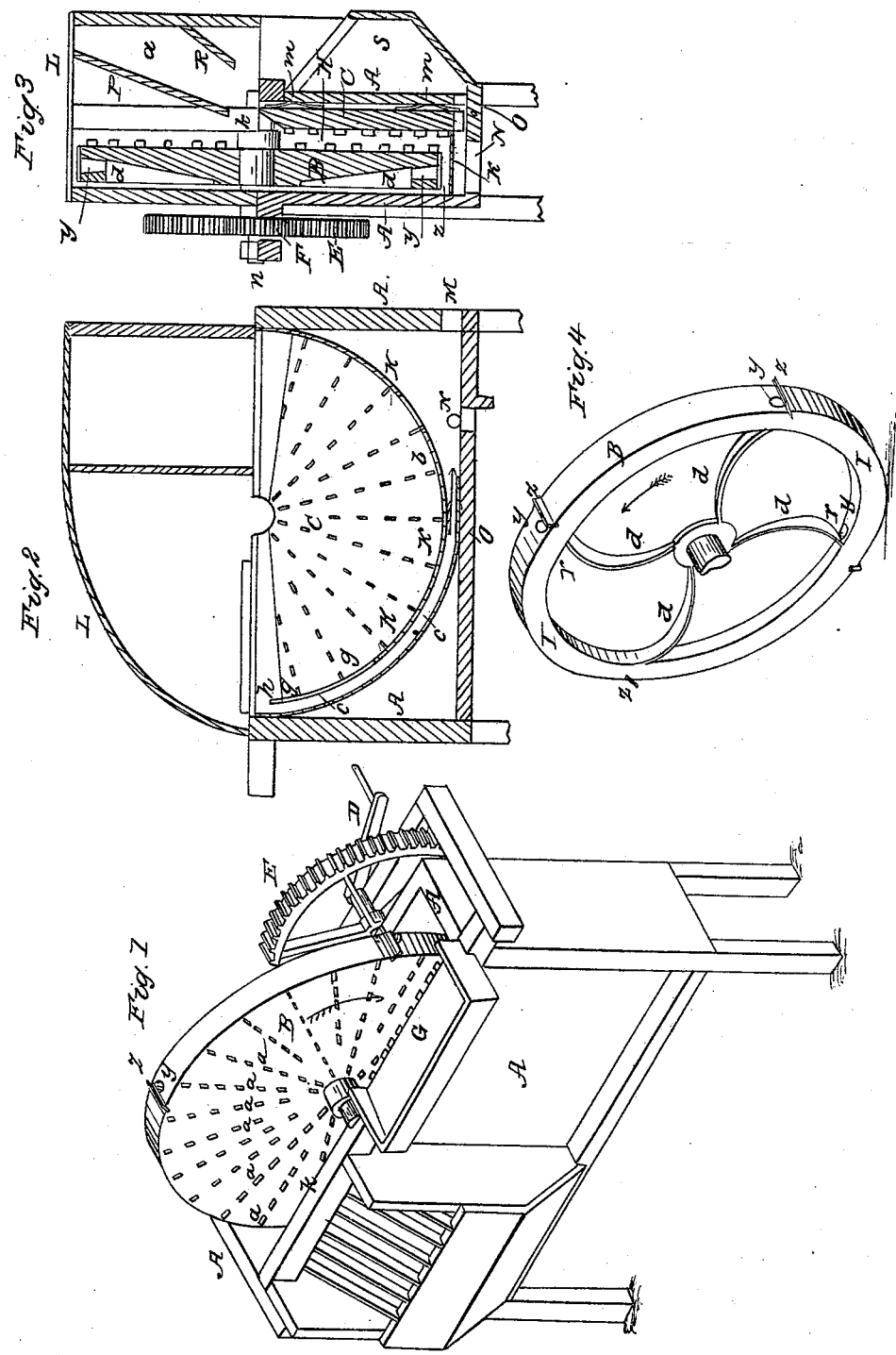

UNITED STATES PATENT OFFICE.

A. H. STEVENS, OF WARSAW, NEW YORK.

CORN-SHELLER.

Specification of Letters Patent No. 14,745, dated April 22, 1856.

*To all whom it may concern:*

Be it known that I, A. H. STEVENS, of Warsaw, in the county of Wyoming and State of New York, have invented certain new and useful Improvements in Machinery for Shelling, Separating, and Cleaning Corn from the Cob; and I do hereby declare that the following is a full and exact description thereof, reference being had to the accompanying drawing, in which—

Figure 1, represents a perspective view of the entire machine the cap or cover being taken off. Fig. 2, represents a longitudinal vertical section, the shelling disk being taken out. Fig. 3, represents a vertical cross section. Fig. 4, a perspective view of the shelling disk seen from the reversed side of that represented in Fig. 1.

The nature of my improvement consists in providing the shelling disk of a corn sheller with air orifices, wings and fans, in such a manner, that said disk will create a blast, by revolving on its shaft, which by means of the peculiar construction of the fans and disk, can be used for separating the corn from the other impurities, immediately when it passes out of the shelling space, this being done by one single operation, without a second process of winnowing.

To enable others skilled in the art to make and use my invention, I will proceed to describe the same with reference to the drawings.

The frame A of the machine consists of a square oblong box, in which the shelling disk B rotates; the journals of the latter, are supported by the two sides of the box A; the shelling disk B, rotates freely in said box, and is provided on one of its sides with a number of sharp projections arranged in radial rows, which correspond to a similar arrangement of projections on a plate inside of the box A as shown at C, Figs. 2 and 3, but with the difference that the projections on the stationary plate C cover only the area of half a circle; these projections or teeth are arranged in such a manner that the radial rows run only alternately through the entire radius, for the purpose of not crowding too many teeth into the center part of the shelling surfaces. The entire apparatus is covered with a cap or cover represented in Figs. 2 and 3.

Motion is imparted to the shelling disk by means of a crank D, whence it is transmitted through the cog wheel E, to the pinion F Fig. 3, which latter being on the same shaft as the shelling disk imparts to it a very rapid revolving motion. The corn is fed into the machine through the inclined hopper G, and rolls down to the edge of the box A, whence by the rapid revolution of the shelling disk B, in the direction of the arrow, it is seized by the teeth $a$, and thus driven through the machine, between the two shelling surfaces, during which time, the grains are detached from the cobs. But as the space H, Fig. 3, between the two shelling plates is not wide enough to permit the cobs to fall through the machine they remain in said space, and are disposed of as hereafter described, and it is only the grains chaff, and dust which will fall to the bottom of the concave K, in the box A, the shape of which concave is concentric with the shelling disk. The grain is then discharged through an aperture $b$, in the bottom of the concave, where it is operated upon, by a blast coming from the passage $c$, and in the direction of the arrow, and which separates the grain from the chaff and dust. This blast is created in the following manner.

The disk B is represented in Fig. 4, from the reversed side of that shown in Fig. 1, and it will be seen in Fig. 4, and also in the cross section Fig. 3, that this side is hollow or dished and that the space inside the rim contains four curved fans, which increase in width toward the periphery. The disk B when in operation, rotates in the direction of the arrow, and thus the fans $d$ create a blast which by the peculiar shape of said fans is crowded into the corners $r$. From these corners, air passages $y$ lead to the outer circumference of the rim I, and thus a current of air will escape constantly from said air passages; this is caught immediately by another system of fans $z$, which thus give it a tangential direction to the circumference of the disk. Suppose now the disk B, be replaced into the concave K, Fig. 2, then the blast just described will be around the entire circumference of the disk, and will strike upward against the cap L of the machine, and downward against the concave K. To lead this blast into the passage $c$, the concave K is provided with apertures $g$, said apertures being of the shape, and arranged as the spaces of a grate, and are sufficiently narrow, as not to permit any grains to pass through them, the blast now enters the passage $c$, by means of these apertures, and also through the open space $h$, and meets the corn just when it falls from the aperture $b$, the chaff and dust is driven out horizontally through the passage M while the heavier corn falls through the aperture N, in the bottom O, of the box A. During this operation the cobs have been driven through the shelling plate C and are elevated so as to appear at the edge K of the box A, they are driven with great velocity out of the box together with such grains of corn as may not have passed through the passage $b$. The grains and cobs thus escape with considerable centrifugal velocity, and the grains being of greater specific gravity than the cobs, are carried straight up, strike against the cap L, and inclined plane P, and fall back into the box A, while the cobs being lighter are thrown into the space Q, fall onto the inclined plane R, and thence into the receiver S.

It is necessary that the shelling plate C, should be secured inside the box A in such manner as to permit a very minute degree of play so as to adapt itself to the size of the cobs, and to prevent the clogging of the machine. For this purpose it leans against four springs, each spring being at one of the corners, and two of which are represented in Fig. 3, at $m$. The revolving disk is also pressed by means of a spring against the plate C, which latter spring can act upon the pivot $n$, of its shaft, and thus keep the shelling disk in its proper place.

Having thus fully described the nature of my invention what I claim therein as new and desire to secure by Letters Patent is—

In combination with the shelling surfaces the wings $z$, openings $y$, and spiral flanges or ribs $d$, for the purpose of creating and driving through the machine a blast or current of air for separating the grain from the other impurities, substantially in the manner, and for the purpose set forth.

A. H. STEVENS.

Witnesses:
J. W. KNAPP,
R. S. LEWIS.